United States Patent [19]
Yuda

[11] Patent Number: 5,269,346
[45] Date of Patent: Dec. 14, 1993

[54] FLOW CONTROL VALVE

[76] Inventor: Lawrence F. Yuda, P.O. Box 499, Westminster, S.C. 29693

[21] Appl. No.: 950,314

[22] Filed: Sep. 24, 1992

[51] Int. Cl.⁵ .................................................. F16K 1/12
[52] U.S. Cl. .................................. 137/599; 251/284; 251/903
[58] Field of Search .................. 251/903, 284, 286; 137/599

[56]      References Cited
    U.S. PATENT DOCUMENTS

| | | | |
|---|---|---|---|
| 1,901,979 | 3/1933 | Meusy | 251/903 X |
| 2,677,526 | 5/1954 | Johnson | 251/284 X |
| 3,857,405 | 12/1974 | Heideman | 137/599 X |
| 4,073,311 | 2/1978 | McGeachy | 137/599 X |
| 4,171,007 | 10/1979 | Bouteille | 137/599 |
| 4,601,310 | 7/1986 | Phillips | 251/903 X |

FOREIGN PATENT DOCUMENTS 62-17478  1/1987  Japan ................................ 251/903

Primary Examiner—Stephen M. Hepperle
Attorney, Agent, or Firm—Ralph Bailey

[57]                ABSTRACT

A flow control valve includes a needle (B) which is carried in an elongated housing within an axial bore which is partially closed at one end by a crimp (C) which forms a retaining clip to prevent inadvertent forceful expulsion of the needle from the flow control valve in the event dislodgement or failure of the retaining means which normally positions the needle within the control valve.

3 Claims, 1 Drawing Sheet 5,269,346

FLOW CONTROL VALVE

BACKGROUND OF THE INVENTION

This invention relates to a flow control valve having a retaining clip preventing inadvertent forceful expulsion of a needle with possible injury to individuals nearby.

Flow control valves of the type employing a needle which is axially disposed in an elongated bore are provided with means for retaining the needle within the bore. However, should the means which normally retain the needle become inadvertently detached or the needle becomes otherwise dislodged due to high fluid pressures which normally obtain within such valves, the needle becomes ejected from the open end of the bore acting as a projectile causing injury to individuals and to equipment depending upon the proper retention and operation of the needle.

Accordingly, it is an important object of the invention to provide a needle valve which is carried within an elongated body or housing within an elongated bore and which is provided with a crimped flange at an open end for receiving the needle with a suitable device for preventing forceful expulsion of the needle should it become dislodged within the axial bore. The crimp is placed in the flange after insertion of the needle into the bore.

Another important object of the invention is to provide an improved flow control valve utilizing a needle wherein the safety of the individual and equipment is assured through proper retention of the needle by means of a guard mechanism which prevents inadvertent expulsion of the needle from the assembly.

Another important object of the invention is the provision of a flow control valve having an elongated housing which carries within it a needle valve assembly with a one way sealing means such as a flexible cup providing a flow path around a portion of the needle valve assembly so as to bypass the needle valve assembly.

SUMMARY OF THE INVENTION

It has been found that a flow control valve utilizing a needle carried in an axial bore within an elongated body or housing may be provided with a flange carried at an open end of the bore for providing a fail safe mechanism or retaining clip for preventing inadvertent forceful ejection of the needle should such become dislodged within the axial bore. Thus, a simple and inexpensive means is provided for preventing inadvertent forceful ejection of the needle which sometimes acts as a projectile injuring individuals and equipment.

The invention further contemplates the provision of the bypass mechanism utilizing a one way seal permitting fluid to bypass a portion of the needle valve assembly before entering an outlet flow passage.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein.

DESCRIPTION OF A PREFERRED EMBODIMENT

Figure 1:
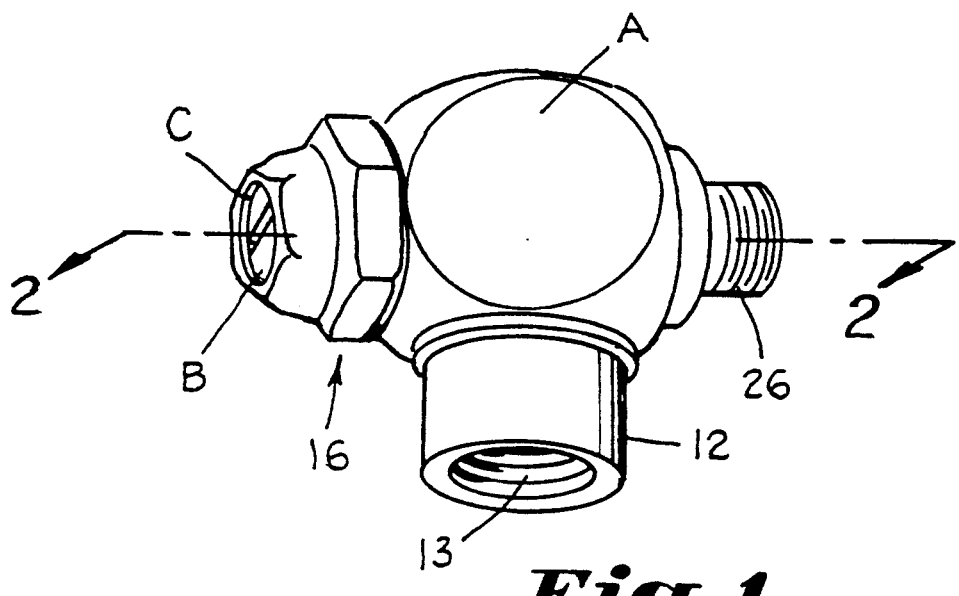
FIG. 1 is a perspective view illustrating a control valve constructed in accordance with the present invention utilizing a flange having an inwardly crimped portion acting as a retaining clip for assuring retention of the needle within the assembly.
Figure 2:
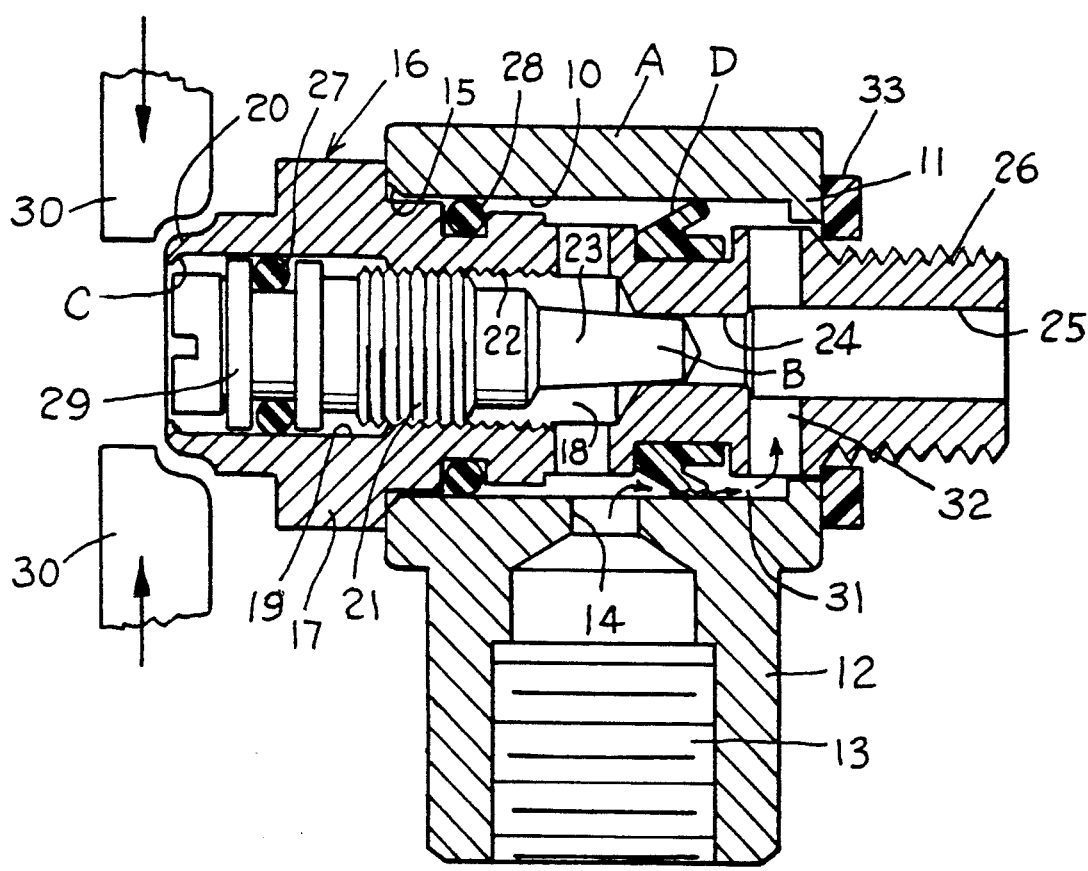
FIG. 2 is a longitudinal sectional elevation taken on the line 2—2 in FIG. 1 further illustrating the control valve with retaining clip and a crimping mechanism preferably having jaws arranged in a hexagonal pattern for crimping a flange defining an opening into the needle valve assembly.

The drawings illustrate a flow control valve including an elongated housing A having a cylindrical chamber therein opening at each end of the housing. An inlet is provided intermediate the ends of the housing opening into the chamber. A needle valve assembly is carried in axial alignment in the cylindrical chamber projecting beyond the housing at each end thereof. An axial opening is defined by a flange on one end of the needle valve assembly. A needle B is received in the axial opening and is contained therein. A crimp C is placed in an outer edge of the flange after the needle is received in the axial opening forming a retaining clip for the needle. A flow passage in the needle valve assembly is controlled by the needle. A one way sealing means D in the chamber extends about the needle valve assembly, and a passageway extending from the inlet and between the sealing means D and the other end of the needle valve assembly opens into the assembly beyond the needle.

The elongated housing A has a cylindrical chamber 10 contained therein, and a flange 11 is turned inwardly. An inlet 12 has a threaded opening 13 for receiving an externally threaded source of fluid under pressure. This fluid enters the cylindrical chamber 10 through a suitable inlet opening 14. One end of the cylindrical chamber 10 is defined by a chamfer 15 while the inwardly projecting flange 11 defines the other end of the cylindrical chamber.

A needle valve assembly broadly defined at 16 is carried in axial alignment in the cylindrical chamber and projects beyond the housing at each end. A needle valve assembly includes an elongated body or housing 17 having an axial opening or bore of varying diameter and being designated at 18. An axial opening 19 is defined by a flange 20 on one end of the needle valve assembly. The axial opening 20 receives the needle valve B in the opening, and the needle is contained therein.

The needle B has a suitable means for adjustably retaining same within the bore 19 such as the external threads 21 which engage the internal threads 22 within a reduced portion of the bore 18.

It will be noted that the tapering portion 23 of the needle B extends into a reduced portion of the bore 24 forming a passageway which opens into an open flow passage 25 within the externally threaded nipple 26. The externally threaded nipple 26 may be connected to a container for receiving fluid under pressure (not shown). Suitable 0-rings constructed of flexible rubbery plastic material 27 and 28 are provided for supplying an air tight seal between the needle B, the axial bore 18, the needle valve assembly, and the chamber 10 respectively.

The needle valve assembly has a flange 29 which acts as a shoulder which engages a crimp C which has been placed within the flange 20 to act as a retaining clip to prevent forceful ejection of the needle B through the opening defined by the flange 20. The crimp C is placed within the flange 20 after insertion of the needle by a suitable crimping tool having jaws 30 arranged in a hexagonal pattern for forceful engagement of the flange 20 applying the crimp C thereto.

A one way sealing means which may be provided in the form of a cup D constructed of resilient flexible rubbery plastic material operates to close a passageway 31 which extends from the inlet 12 and the sealing means D and the other end of the needle valve assembly opening into the threaded portion of the assembly beyond the needle as through a passageway 32. A flexible washer 33 is illustrated for accommodating a connection by means of the nipple 26. It should be noted that the inlet 12 permits the fluid to flow into the passageway 31 past the one way sealing cup D and into the container for fluid under pressure. If the passageway 32 is omitted, the apparatus function as a more conventional needle valve. In any event, the crimp C acts as a fail safe retaining clip to prevent forceful inadvertent expulsion of the needle from the needle valve assembly in such a way as to injure the individual or do damage to the apparatus which is dependent upon the proper functioning of the needle valve.

While a preferred embodiment of the invention has been described using specific terms, such description is for illustrative purposes only, and it is to be understood that changes and variations may be made without departing from the spirit or scope of the following claims.

What is claimed is:

1. A flow control valve comprising:
    a first elongated housing having a cylindrical chamber therein opening at each end of the housing;
    an inlet intermediate the ends of said first elongated housing opening into said chamber;
    a needle valve assembly including a second elongated housing carried in axial alignment in said cylindrical chamber projecting beyond said first elongated housing at each end thereof;
    an axial opening defined by a flange on one end of said second elongated housing;
    means intermediate the ends of said needle adjustably retaining said needle in said axial opening;
    a crimp placed in an outer edge of said flange after said needle is received in said axial opening forming a retaining clip for said needle in spaced relation outwardly of said means and out of contact therewith for all adjusted positions of said needle valve; and
    a flow passage in said needle valve assembly controlled by said needle valve.

2. The structure set forth in claim 1 including a one way sealing means in said chamber extending about said needle valve assembly, and a passageway extending from the inlet and between said sealing means and the other end of said needle valve assembly opening into said assembly beyond said needle.

3. A flow control valve comprising:
    a needle valve assembly including an elongated body having an axial bore therein;
    said axial bore including an axial opening defined by a flange on one end of said needle valve assembly;
    a needle container in said axial opening having external threads integrally formed thereon engaging internal threads of said axial opening;
    said threads being located intermediate the ends of said needle retaining said needle in said axial opening for longitudinal adjustment;
    a crimp placed in an outer edge of said plane after said needle is received in said axial opening forming a retaining clip for said needle in spaced relation outwardly of said threads and out of contact therewith for all adjusted positions of said needle valve; and
    a flow passage in said needle valve assembly controlled by said needle valve.

* * * * *